United States Patent [19]
Ikeda

[11] 4,256,399
[45] Mar. 17, 1981

[54] ELECTROPHOTOGRAPHIC COPYING APPARATUS EQUIPPED WITH IMPROVED BRAKING DEVICE FOR SCANNING SYSTEM

[75] Inventor: Hiroshi Ikeda, Aichi, Japan

[73] Assignee: Minolta Camera Kabushiki Kaisha, Osaka, Japan

[21] Appl. No.: 27,015

[22] Filed: Apr. 3, 1979

[30] Foreign Application Priority Data

Apr. 10, 1978 [JP] Japan ............................... 53-47319[U]
Apr. 15, 1978 [JP] Japan ................................. 53-44707

[51] Int. Cl.³ ...................... G03G 15/28; G03G 15/32
[52] U.S. Cl. ...................................................... 355/8
[58] Field of Search ...................................... 355/3 R, 8

[56] References Cited

U.S. PATENT DOCUMENTS

3,990,792  11/1976  Kono et al. ............................... 355/8
4,158,499   6/1979  Hattori et al. ............................ 355/8

Primary Examiner—Fred L. Braun
Attorney, Agent, or Firm—Wenderoth, Lind & Ponack

[57] ABSTRACT

A slit exposure scanning type electrophotographic copying apparatus equipped with a braking device for the scanning system. The braking device includes a brake shaft rotatably disposed in a driving mechanism of the scanning system, and a spring member which is mounted on the brake shaft and is adapted to impart a braking force at least at a scanning starting position which is decreased in its braking force following starting of the scanning.

3 Claims, 13 Drawing Figures

ELECTROPHOTOGRAPHIC COPYING APPARATUS EQUIPPED WITH IMPROVED BRAKING DEVICE FOR SCANNING SYSTEM

BACKGROUND OF THE INVENTION

The present invention relates to an electrophotographic copying apparatus and more particularly, to a slit exposure scanning type electrophotographic copying apparatus equipped with an improved braking device for a scanning system Commonly, in a slit exposure scanning type electrophotographic copying apparatus, suitable clutch means provided in a driving mechanism thereof is employed for starting scanning of the scanning system, i.e. reflecting mirrors, a light source or a platform to support an original to be copied thereon. In the starting as described above, however, the scanning system is subjected to abrupt start of the movement thereof with a considerable shock, and consequently to large speed variations as shown by the curve A in FIG. 7, thus resulting in indefiniteness or blur in the copied images. Therefore, it is necessary to effect a considerable amount of preliminary displacement at the starting of scanning of the scanning system. However the above arrangement has the disadvantage that an extra space equivalent to the preliminary displacement is required, with consequent reduction of copying speed, especially in a high speed copying apparatus.

Figure 7:
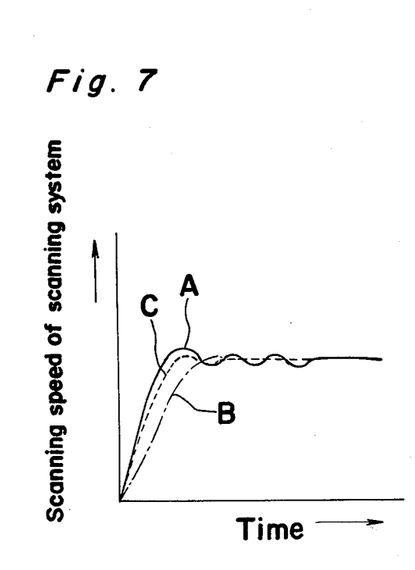

In order to overcome the disadvantage as described above, there have conventionally been proposed arrangements wherein the clutch means is replaced by an exclusive motor having superior speed increase characteristics or wherein a brake means is employed which is actuated during the scanning for reduction of the variations in speed. However, the former arrangement as described above, in which the time of increase of the speed of the exclusive motor is slow as shown by the curve B in FIG. 7, is not necessarily best suited for high speed copying. Meanwhile, the latter arrangement may be classified into two types, and in one type wherein the brake means is temporarily actuated only during the scanning starting time, torque variation is undesirably brought about in the case of the high speed copying, giving rise to a possibility that the vibration of reflecting mirrors takes place upon releasing of the brake means, while in the other type in which a predetermined braking force is constantly applied during scanning of the scanning system, the necessity for driving at high torque at all times results in increase of loss of time, for example, during change-over from the scanning to returning.

On the other hand, in the known slit exposure scanning type electrophotographic copying apparatuses as described in the foregoing, the structure is generally so arranged that, in the equal size copying at a magnification of 1:1, the scanning speed of the scanning system (optical system or original platform) is equal to the moving speed of the photoreceptor surface, while in the copying at a magnification of m, the scanning speed is set to be 1/m, with the moving speed of the photoreceptor surface being made constant. For the purpose as described above, a speed change device capable of outputting revolutions corresponding to the copying magnifications is incorporated in the scanning type driving mechanism, but the speed change device as described above has the disadvantage that it has a complicated structure for an increase of the copying magnification, with consequent large size of the copying apparatus itself. Although a known stepless speed change device could be used, such a stepless speed change device is not only expensive, but too complicated, thus not being preferable from the viewpoint of actual use.

SUMMARY OF THE INVENTION

Accordingly, an essential object of the present invention is to provide a slit exposure scanning type electrophotographic copying apparatus equipped with an improved braking device for a scanning system in which, during starting of scanning of the scanning system, vibration or wobbling of the scanning system by clutch means is reduced through application of maximum braking force, while the braking force is adapted to be attenuated following the scanning to minimize the braking force at the change-over to returning of the scanning system for reduction of loss of time so as to be especially suitable for high speed copying.

Another important object of the present invention is to provide a copying apparatus equipped with an improved braking device for a scanning system of the above described type which is equipped with a speed change device in which more than two speed change ratios are available with respect to one speed change ratio by a simple construction.

A further object of the present invention is to provide an improved braking device for a scanning system of the above described type which functions accurately with high reliability, and can be readily incorporated into copying apparatuses at low cost.

In accomplishing these and other objects, according to one preferred embodiment of the present invention, the slit exposure scanning type electrophotographic copying apparatus includes an original platform of transparent plate material, an optical system having a light source for illuminating an original to be copied from under the surface of the original platform and reflecting mirrors and lens assembly for directing a light image of the original illuminated by the light source onto a photoreceptor, and means for scanning the original including means for relatively moving the optical system and the original platform, and the scanning means further includes a braking device which comprises a brake shaft rotatably disposed in a driving mechanism of the scanning system, and spring means which is mounted on said brake shaft so as to apply a braking force at least at a scanning starting position and which is attenuated following starting of the scanning.

By the arrangement as described above, vibration or wobbling of the scanning means due to presence of clutch means is advantageously reduced through application of maximum braking force during starting of the scanning means, with the braking force being attenuated following the scanning so as to be minimized at the change-over to returning of the scanning means for reduction of loss of time especially in high speed copying, with substantial elimination of the disadvantages inherent in the conventional arrangements of this kind.

BRIEF DESCRIPTION OF THE DRAWINGS

These and other objects and features of the present invention will become apparent from the following description and with reference to the accompanying drawings, in which.

Before the description of the present invention proceeds, it is to be noted that like parts are designated by like reference numerals throughout several views of the accompanying drawings.

DETAILED DESCRIPTION OF THE INVENTION

Figure 1:
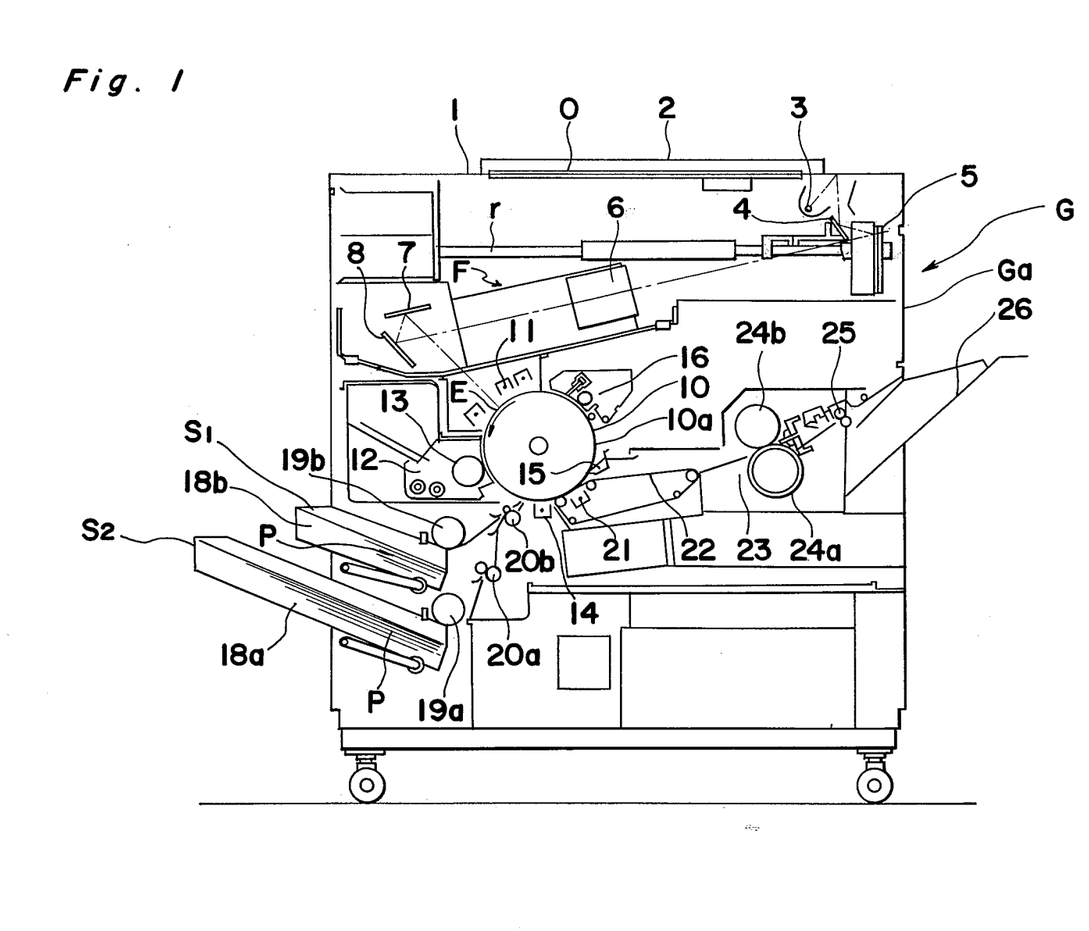
FIG. 1 is a schematic side sectional view of an electrophotographic copying apparatus in which a braking device for a scanning system according to the present invention can be incorporated.

Referring now to the drawings, there is shown in FIG. 1 a slit exposure scanning type electrophotographic copying apparatus using a toner powder image transfer method to which the braking device for the scanning system directly related to the present invention may be applied.

In FIG. 1, the copying apparatus G generally includes an apparatus housing Ga of rectangular box-like configuration defined by walls, and a photosensitive member or photoreceptor drum 10 of known construction having a photoconductive photoreceptor surface 10a provided on the outer periphery thereof and rotatably disposed at approximately the central portion of the housing Ga for rotation in the direction of the arrow to cause the photoreceptor surface 10a to sequentially pass various processing stations disposed therearound for image formation, such as a charging station with a corona charger 11, an exposure station E, a developing station having a magnetic brush type developing device 12 including a developing sleeve 13, a transfer station having a transfer charger 14, a copy paper sheet separating station with an AC discharger 21 and a separating claw 15, a cleaning station having a cleaning unit 16, etc. As the photoreceptor drum 10 rotates, the photoreceptor surface 10a thereof is uniformly charged to a predetermined potential by the corona charger 11, and the light image of an original O obtained through scanning of the original O by a scanning system F described later is projected onto the photoreceptor surface 10a at the exposure station E to form thereon an electrostatic latent image of the original O which is then developed into a visible toner image by the developing device 12 by the known magnetic brush method for being subsequently transferred by the transfer charger 14 onto a copy paper sheet P transported in synchronization with the proceeding of the development, and therafter the copy paper sheet P bearing the visible toner image thus transferred thereto is separated from the photoreceptor surface 10a by means of the AC discharger 21, separating claw 15, etc. so as to be further transported, by a transportation belt 22 movably supported by a plurality of rollers in a position subsequent to the transfer charger 14, to a fixing device 23 including a heat roller 24a and a pressing roller 24b for fixing the visible toner image onto the copy paper sheet P passing therebetween by fusing, and then the copy paper sheet bearing the copied image is discharged through rollers 25 onto a tray 26, while residual toner remaining on the surface 10a of the photoreceptor drum 10 is scraped off the surface 10a by the cleaning unit 16 for completion of one copying cycle.

At the upper portion 1 of the housing Ga, there is fixedly provided a platform 2 of light transmitting transparent plate material for supporting the original O to be copied, while below and adjacent to the platform 2, the scanning optical system F including a light source 3, first and second reflecting mirrors 4 and 5 and a lens assembly 6, and also fixed reflecting mirrors 7 and 8, is disposed. The light source 3, first and second reflecting mirrors 4 and 5, etc. are arranged to be movable or scanned along rail member r by a scanning system driving mechanism described later toward the left in FIG. 1 for optically scanning the original O supported on the platform 2, and the scanning speed is such that the second reflecting mirror 5 is moved at a speed of $\frac{1}{2}$ V when the speeds of the light source 3 and the first reflecting mirror 4 are set to be V, as is known to those skilled in the art. The original O supported on the platform 2 with its reverse face directed upward is continuously subjected to light rays projected from the light source 3 following the scanning, and the light rays reflected from the original O, i.e. the light image of the original O, are directed onto the photoreceptor surface 10a at the exposure station E by the first and second reflecting mirrors 4 and 5, lens assembly 6, and the third and fourth reflecting mirrors 7 and 8.

For making it possible to simultaneously stock, for example, two different sizes of copy paper sheets P, the copying apparatus G is provided, at the lower left portion of the housing Ga, with upper and lower cassette loading sections $S_1$ and $S_2$ respectively loaded with copy paper sheet containers or cassettes 18a and 18b in which stacks of the copy paper sheets P of different sizes are accommodated, and by selectively rotating copy paper sheet feeding rollers 19a and 19b adapted to contact the leading edges of the copy paper sheets P and provided in positions corresponding to the cassettes 18a and 18b in the counterclockwise direction in FIG. 1 by suitable means (not shown), either the copy paper sheets P contained in the cassette 18a or those in cassette 18b are fed one by one from the top of the stack of the copy paper sheets P toward the transfer station through corresponding guide plates and feeding rollers 20a and 20b for transferring the developed toner powder image onto the copy paper sheet P in the manner as described earlier.

Figure 2:
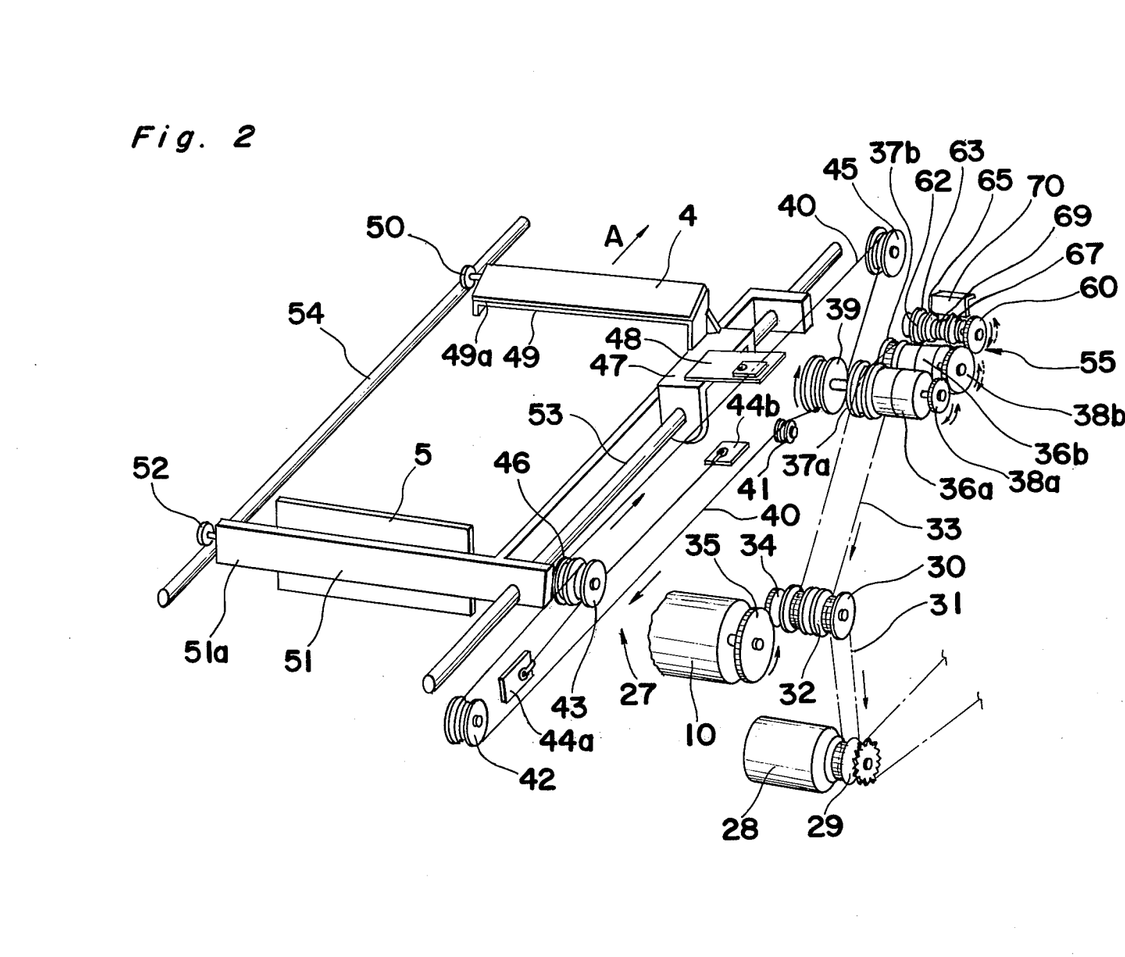
FIG. 2 is a perspective view showing on an enlarged scale, one preferred embodiment of the construction of a scanning system driving mechanism employed in the copying apparatus of FIG. 1.

Referring to FIG. 2, there is schematically shown the scanning system driving mechanism 27, in which the rail member r mentioned earlier includes rails or guide shafts 53 and 54 arranged in spaced and parallel relation with each other in the direction of scanning. On the rail 53 are slidably mounted a first slider member 47 for supporting one end of a support plate 49 on which the first reflecting mirror 4 and the light source 3 are mounted, and a second slider member 51 for supporting the second reflecting mirror 5, the sliders being at opposite ends of the rail 53, while the other ends 49a and 51a of the support plate 49 and second slider member 51 are supported on the rail 54 by corresponding rollers 50 and 52 rotatably provided on said ends 49a and 51a. One end of a scanning wire 40 extending around an output pulley 39 is fixed to a fixing plate 44a after the wire 40 has been passed around a pulley 43 rotatably supported by the second slider member 51 and over a tension pulley 41 and another pulley 42, while the other end of the scanning wire 40 is secured to a bracket 48 extending outwardly from the first slider member 47 after passing around a pulley 45 and the other end is fixed to a fixing plate 44b after the wire 40 has been passed around a pulley 46 rotatably supported by the same shaft carrying the pulley 43.

A timing belt 31 is connected between an output sprocket 29 fixed to the shaft of a main motor 28 and an intermediate sprocket 30, while another timing belt 33 is passed around an intermediate sprocket 32 fixed to the same shaft as said sprocket 30, and sprockets 37a and 37b of a scan clutch 36a and a return clutch 36b. The timing belts 31 and 33 are respectively driven in the direction of the arrows by the main motor 28, with rotational force in one direction being transmitted to the sprockets 37a and 37b of the clutches 36a and 36b. Meanwhile, a gear 34 fixed to the same shaft as that of the intermediate sprockets 30 and 32 is in mesh with a gear 35 of the photoreceptor drum 10 to impart to the drum 10 rotational force in one direction. Gears 38a and 38b for the scan clutch 36a and return clutch 36b are in mesh with each other, while the gear 38b engages a brake gear 60 of a braking device 55 to be described in detail later. When the scan clutch 36a is ON or energized, the return clutch 36b is turned OFF or de-energized, with the sprocket 37b rotating idly, and the rotational force transmitted to the sprocket 37a directly rotates the output pulley 39 in the forward direction as shown by the arrow, and the shaft of the clutch is simultaneously connected to a brake gear 60 of the braking device 55 through the gears 38a and 38b. On the other hand, when the return clutch 36b is turned ON or energized, the scan clutch 36a is turned OFF or de-energized, with the sprocket 37a rotating idly, and the rotational force transmitted to the sprocket 37b causes the output pulley 39 to rotate in the opposite direction to that shown by the arrow through the gear 38b and the gear 38a. The the gear 38b on the clutch 36b is connected to the brake gear 60 in a similar manner as during the scanning.

Figure 3:
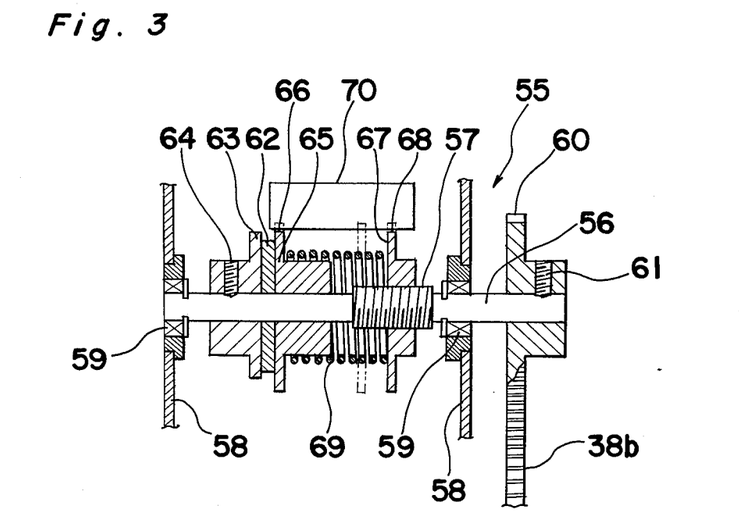
FIG. 3 is a side sectional view showing, on a still further enlarged scale, the construction of the braking device employed in the arrangement of FIG. 2, FIGS. 4 and 5 are cross sectional views showing modifications of a coil spring employed in the braking device of FIG. 3.

Referring to FIG. 3, the braking device 55 generally comprises the brake gear 60, a brake member 62, a brake plate 65, a nut member 67, a coil spring 69 mounted on a brake shaft 56, and a retaining plate 70. The brake shaft 56 has external threads 57 at approximately the central portion thereof and is rotatably supported by frames 58 in bearings 59. The brake gear 60 secured to one end of the brake shaft 56 by a screw 61 is in engagement with the gear 38b of the return clutch 36b as described earlier. The brake member 62 is made of strong material with a high coefficient of friction, preferably of leather or the like, and is held between a presser plate 63 fixed to the brake shaft 56 by a screw 64 and the brake plate 65, which is slidably mounted on the brake shaft 56 for movement in the axial direction so as to be pressed against the brake member 62. A nut member 67 screwed onto the external threads 57 of the brake shaft 56 is held against rotation together with the brake plate 65 by the engagement of respective notched portions 66 and 68 with the retaining plate 70. Therefore, the nut member 67 is capable of reciprocating in the axial direction during forward and reverse rotation of the brake shaft 56. The coil spring 69a mounted on the brake shaft 56 in a compressed state between the brake plate 65 and the nut member 67 and presses, at its one end, the brake member 62 against the presser plate 63 through the brake plate 65 so as to impart the braking force to the brake shaft 56. The braking force is attenuated as the nut member 67 moves on the external threads 57 toward the right, i.e. in the direction away from the brake member 62, and increased as the nut member 67 moves toward the left in FIG. 3, i.e. in the direction toward the brake member 62. Accordingly, if the nut member 67 is screwed onto the external threads 57 of the brake shaft 56 in such a manner that the nut member 67 moves from the pressing position at the left toward the right following starting of the scanning, maximum braking force is applied at the starting of the scanning, with the braking force being gradually attenuated following the scanning.

By the above arrangement, prior to the starting of the scanning, the nut member 67 of the braking device 55 is located at the left end of the external threads 57 as shown by chain lines in FIG. 3, while the coil spring 69 is exerting the maximum braking force, i.e. spring force thereof. Upon starting of the main motor 28, with scanning signals being applied to the clutches 36a and 36b, the scan clutch 36a is turned ON, while the return clutch 36b is turned OFF, and the output pulley 39 rotates forward in the direction of the arrow as described earlier. As the scanning wire 40 is moved in the clockwise direction, the light source 3, first reflecting mirror 4, and second reflecting mirror 5 start scanning respectively on the guide shafts or rails 53 and 54 in the direction indicated by the arrow A. Simultaneously, the rotational force transmitted to the sprocket 37a of the scan clutch 36a is further transmitted to the brake gear 60 of the braking device 55 through the gear 38a and gear 38b for rotating the brake shaft 56 in the forward direction. The brake shaft 56 to which the maximum breaking force is applied due to pressure contact of the brake plate 65 with the brake member 62 by the spring force of the coil spring 69 is rotated together with the presser plate 63 by slipping relative to the brake member 62. In other words, the presser plate 63 rotates by slipping with respect to the brake plate 65 held against rotation by the retaining plate 70 through the brake member 62.

The braking force as described above is applied to the output pulley 39, which consequently rotates in the forward direction against the braking force of the coil spring 69. During the scanning, the nut member 67 gradually moves toward the right due to the forward rotation of the brake shaft 56, and the braking force decreases.

Figure 8:
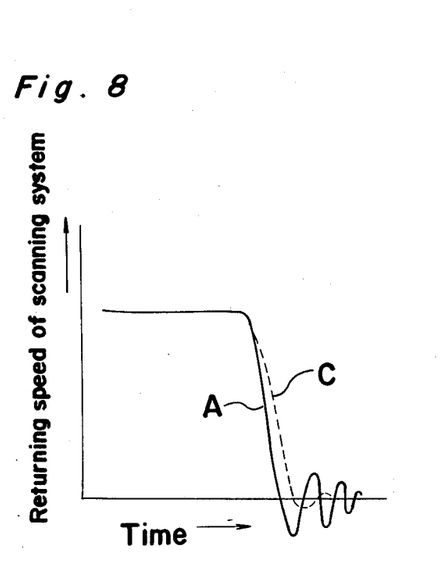

Upon completion of the scanning, the nut member 67 is located at the right end of the external threads 57, and the braking force i.e. spring force of the coil spring 69 is at a minimum. In the above case, return signals are applied to the clutches 36a and 36b to turn OFF the scan clutch 36a and to turn ON the return clutch 36b, and the output pulley 39 is rotated in the reverse direction, with the scan wire 40 being moved in the counter-clockwise direction for causing the light source 3, first mirror 4 and second mirror 5 to return. In the above state, the rotational force transmitted to the sprocket 37b of the return clutch 36b is further transmitted to the brake gear 60 of the braking device 55 from the gear 38b for causing the brake shaft 56 to rotate in the reverse direction. During the reverse rotation of the brake shaft 56, the nut member 67 is gradually moved toward the left, with the coil spring 69 being compressed to increase the braking force. The braking force reaches the maximum level when the nut member 67 has moved to the position shown by the chain lines in FIG. 3 upon completion of the returning, i.e. when the scanning system has returned to the scanning starting position. In the operation as described in the foregoing, the maximum braking force of the coil spring 69 is applied during the starting of the scanning of the scanning system, and the vibration or wobbling of the scanning system during the increase of speed is considerably reduced as shown in the curve C of FIG. 7 as compared with the curve A which is for the increase in the absence of the braking action, while the time required for the increase is shorter than that in the case where an exclusive motor (not shown) is employed, i.e. the case represented by the curve B. Moreover, since the braking force is attenuated as the scanning proceeds, no extra torque is produced as compared with arrangements applying a constant torque at all times, thus reducing burdens on the driving mechanism 27 including the main motor 28, etc. and furthermore, since the torque is varied smoothly, there is no possibility of vibration or wobbling during the scanning. Meanwhile, since the braking force is gradually applied during the returning also so as to be at the maximum upon termination of the returning, the braking device 55 of the present invention functions as a damper as well. Accordingly, the impact at the termination of the returning is reduced as shown in the curve C of FIG. 8 as compared with that represented by the impact curve A in the absence of a damper.

Figure 4:
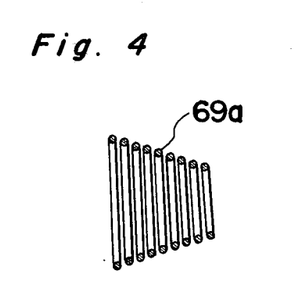
Figure 5:
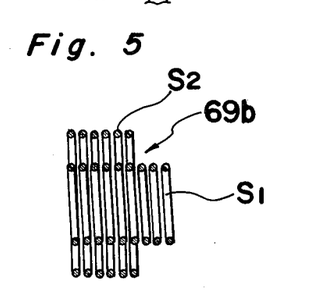
Figure 6:
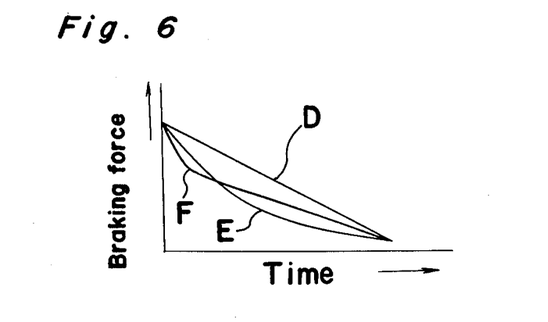
FIG. 6 is a graph showing characteristics of the coil spring employed in the braking device of FIG. 3, FIGS. 7 and 8 are graphs explanatory of the impact characteristics of the scanning system.

It should be noted here that in the foregoing embodiment, although the coil spring 69 having a straight shape is employed, the coil spring may be replaced, for example, by a coil spring 69a of conical shape as shown in FIG. 4, or by a double coil spring 69b including a long straight spring $S_1$ of small diameter concentrically disposed in a short straight spring $S_2$ of large diameter as shown in FIG. 5. In FIG. 6, the braking characteristic of the coil spring 69 is represented by the straight line D, that of the coil spring 69a by the curve E, and that of the coil spring 69b including the springs $S_1$ and $S_2$ by the curve F.

It should also be noted that the braking action is not necessarily continued up to the scanning terminating position, but it may be so arranged that the braking force is discontinued during the course of the scanning.

It should further be noted that although the braking device according to the present invention is mainly described in the foregoing embodiment with reference to a copying apparatus in which the optical system is moved for the scanning of the original, the concept of the present invention is not limited in its application to the copying apparatus of the above described type alone, but is readily applicable to scanning type copying apparatuses in which the original platform is moved, with the braking device of the invention being installed in the driving mechanism thereof.

Figure 9:
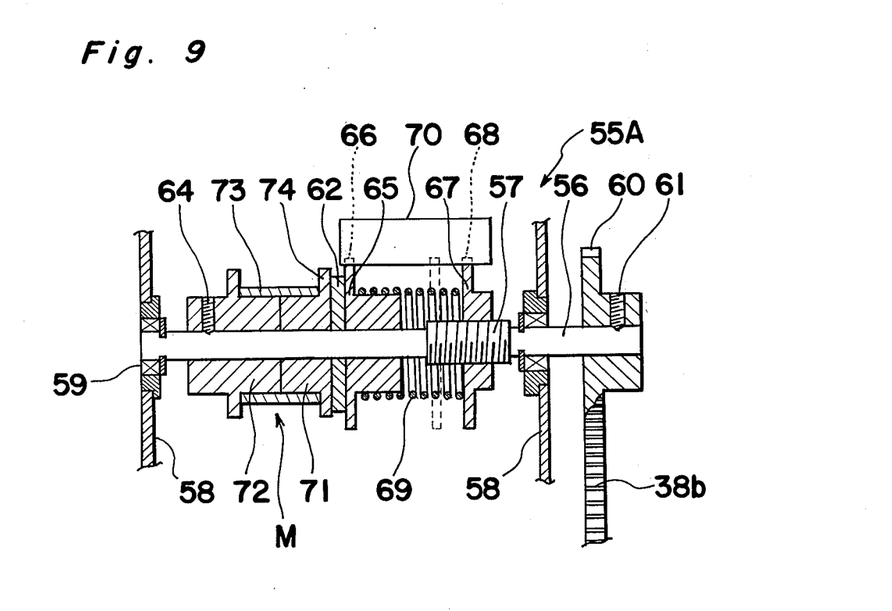
FIG. 9 is a view similar to FIG. 3, which particularly shows a modification thereof.

Referring to FIG. 9, there is shown a modification of the braking device 55 of FIG. 3. In the modified braking device 55A of FIG. 9, the presser plate 63 described as employed in the arrangement of FIG. 3 is replaced by a one-way clutch mechanism M as described hereinbelow, and the brake member 62 is disposed between the brake plate 65 slidably mounted on the brake shaft 56 for movement in the axial direction and a presser plate 74 of a first clutch drum 71. The one-way clutch mechanism is constituted by a first clutch drum 71 together with a second clutch drum 72 fixed to the brake shaft 56 by a screw 64 and a kick spring 73 wound around peripheral surfaces of the drums 71 and 72 as shown. Since the clutch mechanism M is a one-way mechanism, it acts to transmit the braking force of the brake member 62 during rotation of the brake shaft 56 in one direction, but not to transmit it during the reverse rotation of the brake shaft 56.

In the arrangement of FIG. 9, prior to the starting of the scanning, the nut member 67 is located at the left end of the external threads 57 as shown by chain lines in FIG. 9, with the coil spring 69 exerting the maximum braking force. Upon starting of the main motor 28, with the scan signals being applied to the clutches 36a and 36b, the first reflecting mirror 4 and second reflecting mirror 5 start moving as described with reference to FIG. 3, while the brake shaft 56 rotates in the forward direction. During the forward rotation of the brake shaft 56, the nut member 67 gradually moves toward the right to reduce the braking force. The one-way clutch mechanism M including the clutch drums 71 and 72 and the kick spring 73 as described earlier transmits the braking force during the forward rotation of the brake shaft 56, but the force is gradually reduced as the braking force is decreased, and is completely ended upon termination of the scanning. When the return signals are applied to the clutches 36a and 36b, the scan clutch 36a is turned OFF, and the return clutch 36b is turned ON, and the output pulley 39 is rotated in the reverse direction to move the scanning wire 40 in the counterclockwise direction for returning the light source 3, first reflecting mirror 4 and second reflecting mirror 5 to the starting positions. In the above case, the rotational force transmitted to the sprocket 37b is further transmitted to the brake gear 60 of the braking device 55A from the gear 38b so as to rotate the brake shaft 56 in the reverse direction. During the reverse rotation of the brake shaft 56, the nut member 67 is gradually moved toward the left in FIG. 9 to compress the coil spring 69, but in this case, due the presence of the one-way clutch mechanism M, i.e. due to the fact that the first clutch 71 is released with respect to the brake member 62, no braking action is applied to the brake shaft 56, and the light source 3, and first and second reflecting mirrors 4 and 5 being returned at a low torque.

The arrangement as described above is necessary for the following reasons.

Since the returning speed is normally set at a speed higher than two times the scanning speed in many cases, an increase of acceleration torque during starting of the returning and of load torque during the returning is needed, and if the braking force is too large, it will sometimes giving rise to fluctuation of speeds, etc. due to impact by the driving system or variations in loads. Therefore, if the braking mechanism is released so that no braking force is applied during the returning, the torque needed for the returning can be reduced to a minimum, so that smooth returning of the light source 3, and the first and second reflecting mirrors 4 and 5 can be achieved.

Figure 10:
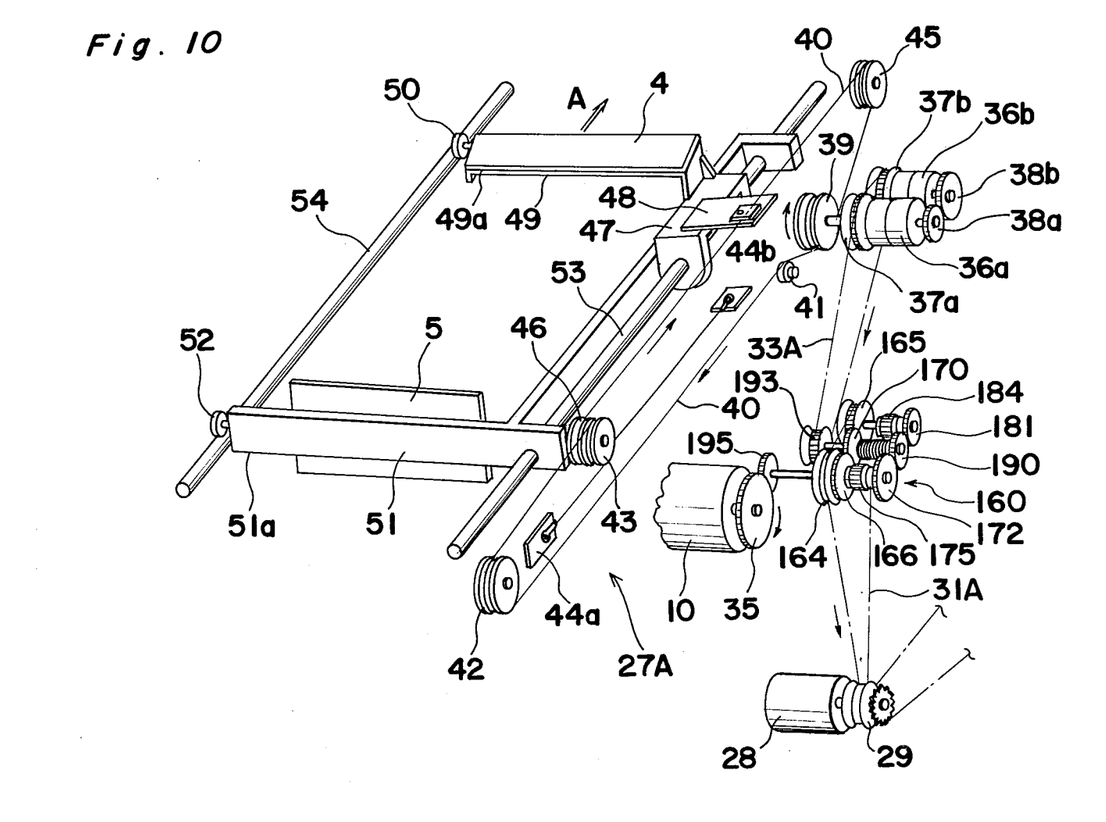
FIG. 10 is a view similar to FIG. 2, but particularly shows a modification thereof in which a speed change device of the present invention is incorporated.

Referring to FIG. 10, there is shown a modification of the scanning system driving mechanism 27 of FIG. 2. In the scanning driving mechanism 27A of FIG. 10, the arrangement of FIG. 2 is modified to include a speed change device 160 as described hereinbelow.

In FIG. 10, a timing belt 31A is connected between the output timing pulley 29 and input timing pulleys 164 and 165 of the speed change device 160 to be described hereinbelow, and another timing belt 33A is connected between an output timing pulley 193 of the speed change device 160 and timing pulleys 37a and 37b of the scan clutch 36a and return clutch 36b. The above timing belts 31A and 33A are respectively driven in the directions shown by the arrows by the main motor 28 through the speed change device 160, and thus, rotational force in one direction is transmitted to the timing pulleys 37a and 37b of the clutches 36a and 36b.

When the scan clutch 36a is turned ON, the return clutch 36b is turned OFF, and the timing pulley 37b and gear 38b rotate idly, and the rotational force transmitted to the timing pulley 37a directly rotates the output pulley 39 in the forward direction indicated by the arrow. On the contrary, when the return clutch 36b is turned ON, the scan clutch 36a is turned OFF, the timing pulley 37a rotates idly, and the rotational force transmitted to the timing pulley 37b causes the output pulley 39 to rotate in the direction reverse to that indicated by the arrow through the gear 38b and gear 38a in mesh therewith.

Since the threading of the scanning wire 40 around the output pulley 39, and the arrangements of the first and second slider members 47 and 51, etc. and functions thereof are similar to those in the arrangement of FIG. 2, detailed description thereof is omitted for brevity, with like parts being designated by like reference numerals.

Figure 11:
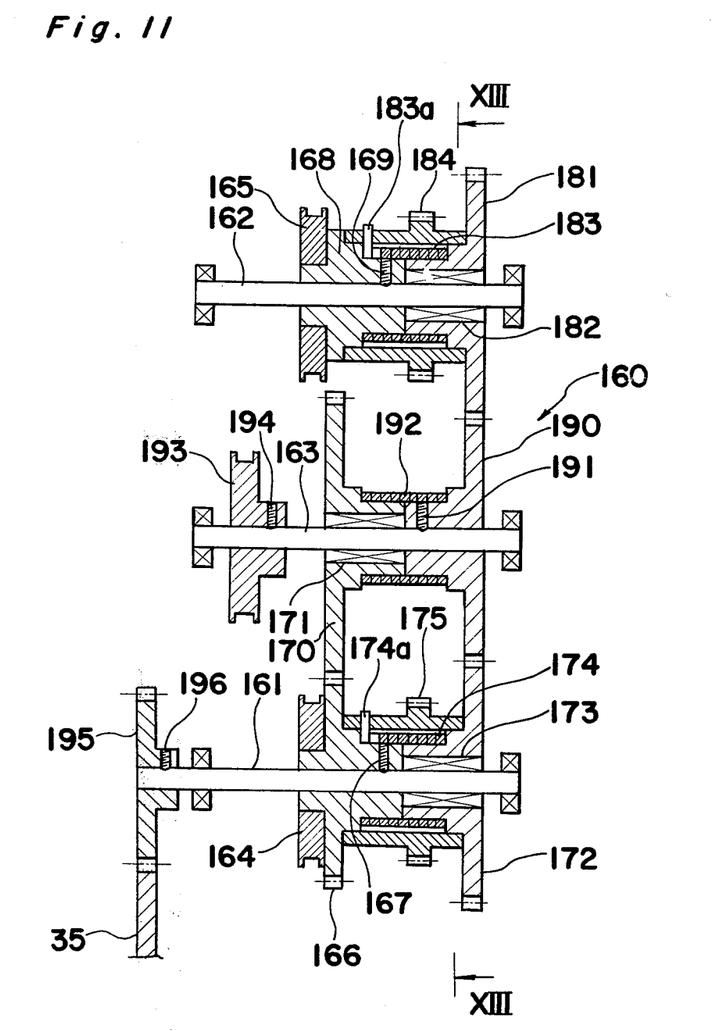
FIG. 11 is a cross sectional view showing, on an enlarged scale, the construction of the speed change device employed in the arrangement of FIG. 10.
Figure 12:
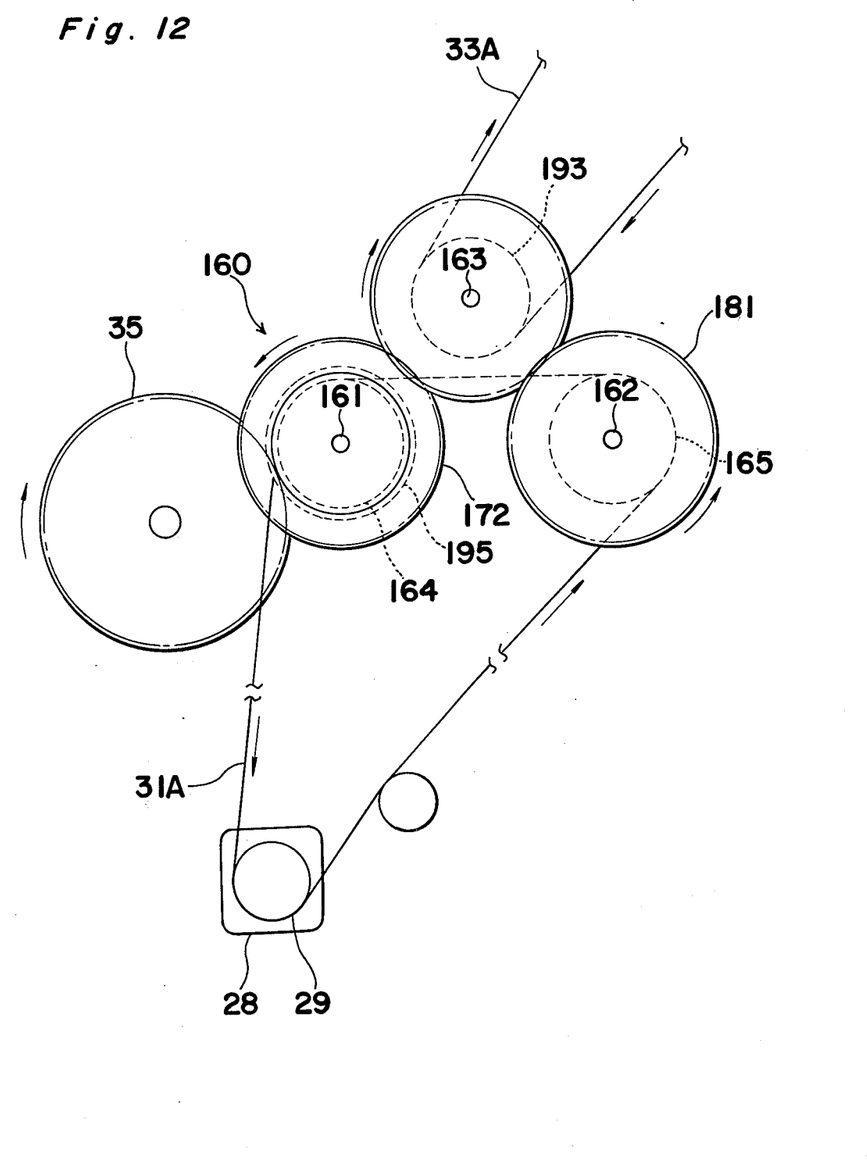
FIG. 12 is a schematic front elevational view of the speed change device of FIG. 11.
Figure 13:
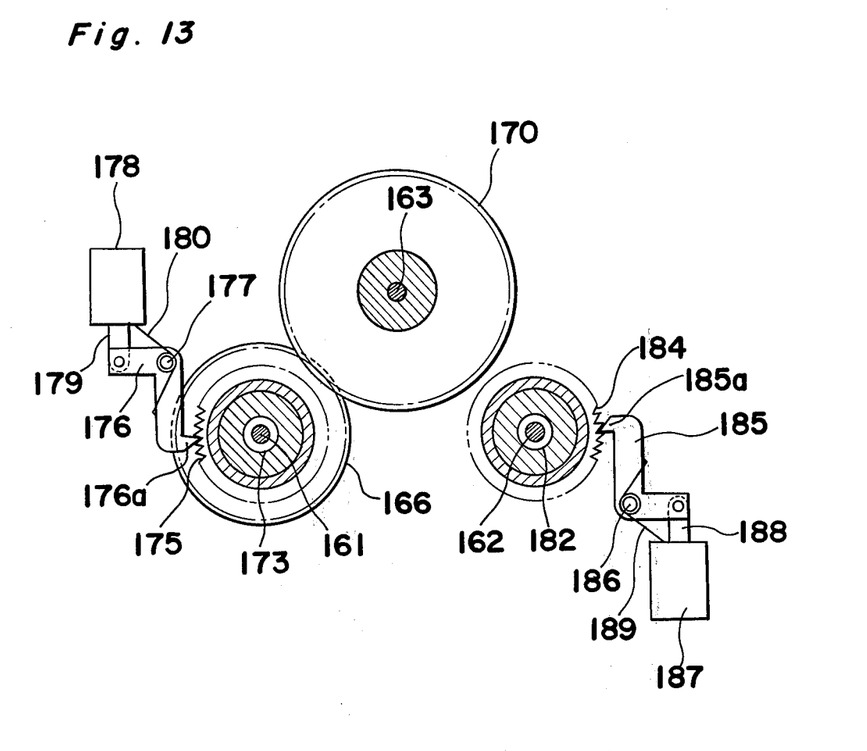
FIG. 13 is a cross sectional view taken along the line XIII—XIII of FIG. 11.

Referring also to FIGS. 11 to 13, the speed change device 160 includes two input shafts 161 and 162 which are rotatably disposed at suitable intervals and in parallel relation with respect to output shaft 163. A first gear 170 is rotatably mounted on the output shaft 163 by a bearing 171 for clockwise rotation in FIG. 10, and a second gear 190 is also fixed to the output shaft 163 by a screw 191, and the output timing pulley 193 is further secured to the shaft 163 by a screw 194 as shown in FIG. 11. On the boss portions of the first and second gears 170 and 190, there is wound a kick spring 192 with a suitable clamping force for functioning as a one-way clutch. When the first gear 170 is rotated in the clockwise direction, the kick spring 192 clamps the boss portions of the first and second gears 170 and 190 for transmitting the driving force from the second gear 190 to the output shaft 163. On the other hand, the kick spring 192 slips when the second gear 190 is rotated clockwise as described hereinbelow, and the first and second gears 170 and 190 are relatively rotatable.

On the two input shafts 161 and 162, gears 172 and 181 having different number of teeth, and in mesh with the second gear 190 are mounted on bearings 173 and 182, and a third gear 166 engaging the first gear 170 is secured to the input shaft 161 by a screw 167, and a gear 195 fixed to the shaft 161 by a screw 196 as in mesh with the gear 35 for driving the photoreceptor 10. On the other hand, an input timing pulley 164 is secured to the boss portion of the third gear 166, and another input timing pulley 165 is fixed to the boss portion of a rotary member 168 secured to the input shaft 162 by a screw 169. Kick springs 174 and 183 which function as clutch means for the gears 172 and 181 are respectively wound in counterclockwise direction on the boss portions of the gears 172 and 181 and boss portions of the third gear 166 and rotary member 168, and are respectively engaged, at ends 174a and 183a thereof, with boss portions of rotatable ratchets 175 and 184. As shown in FIG. 13, claw portions 176a and 185a each provided at one end of levers 176 and 185 pivotally supported by shafts 177 and 186 and urged counterclockwise by torsion springs 180 and 189 are respectively engageable with the teeth of ratchets 175 and 184, and the other ends of the levers 176 and 185 are coupled to plungers 179 and 188 of solenoids 178 and 187. When the solenoids 178 and 187 are in the OFF state, the levers 176 and 185 are rotated in the counterclockwise direction by the action of the torsion springs 180 and 189, and the claw portions 176a and 185a of the levers 176 and 185 engage the ratchets 175 and 184 to prevent the ratchets 175 and 184 from rotating. Therefore, even when the third gear 166 and rotary member 168 are driven for rotation, the kick springs 174 and 183 do not clamp the boss portions of the gears 172 and 181, and thus the gears 172 and 181 are permitted to rotate freely. On the other hand, when the solenoids 178 and 187 are turned ON, the plungers 179 and 188 thereof are retracted causing clockwise rotation of the levers 176 and 185 to a certain extent, and the claw portions 176a and 185a are separated from the teeth of the ratchets 175 and 184 for allowing said ratchets to rotate freely. Accordingly, when the third gear 166 and rotary member 168 are rotated in the counterclockwise direction, the kick springs 174 and 183 respectively clamp the boss portions of the third gear 166, gear 172 and rotary member 168 and gear 181 to transmit the driving force to the gears 172 and 181. It is to be noted here that the solenoids 178 and 187 are not energized simultaneously, but one or the other of them is selectively turned ON.

Regarding the gear ratios of the respective gears 170, 190, 166, 172 and 181, the third gear 166 and first gear 170 constitute the driving force transmission system for equal size copying at a magnification of 1:1, and on the assumption that the gear ratio thereof is 1, the gear ratio of the gear 172 and second gear 190 constituting the driving force transmission system for copying at a reduction rate of 0.7857 times is 1/0.7857. Meanwhile, the gear ratio of the gear 181 and second gear 190 forming the driving force transmission system for copying at a reduction rate of 0.6467 times is 1/0.6467.

The operation of the speed change device 160 will be described hereinbelow together with that of the driving mechanism 27A.

In in equal size copying at magnification of 1:1, the solenoids 178 and 187 are turned OFF, and the gears 172 and 181 rotate freely. In association with the operation of a print switch (not shown), the scan clutch 36a is turned ON, while the return clutch 36b is turned OFF, and the main motor 28 causes the output timing pulley 29 to rotate in the counterclockwise direction. The driving force is transmitted to the input timing pulleys 164 and 165 of the speed change device 160 through the timing belt 31A, and further to the first gear 170 from the third gear 166 to rotate the first gear 170 in the clockwise direction. The rotation of the first gear 170 causes the kick spring 192 to be wound in and rotation force is transmitted to the second gear 190 so as to rotate the output timing pulley 193 in the clockwise direction through the output shaft 163. From the output timing pulley 193, the driving force is further transmitted to the clutches 36a and 36b through the timing belt 33A, and thus, the output pulley 39 is rotated in the forward direction indicated by the arrow, causing the movement of the scanning wire 40 in the clockwise direction, and the light source 3, and first and second reflecting mirrors 4 and 5 start scanning in the direction of the arrow A along the guide shafts or rails 53 and 54 as described earlier with reference to FIG. 10.

Upon completion of the scanning, the scan clutch 36a is turned OFF and the return clutch 36b is turned ON by the return signals to rotate the output pulley 39 in the reverse direction, causing the movement of the scanning wire 40 in the counterclockwise direction so as to cause the light source 3, and first and second reflecting mirrors 4 and 5 to return.

In the reduced size copying at a reduction rate of 0.7857 times, the solenoid 178 is turned ON and the solenoid 187 is turned OFF, and the gear 181 rotates freely. Therefore, the rotational driving force transmitted to the input timing pulley 164 causes the gear 172 to rotate by winding in the kick spring 174 through the third gear 166, and from the gear 172, rotational force is transmitted to the output timing pulley 193 to rotate in the clockwise direction through the second gear 190 and output shaft 163. In the above condition, the first gear 170 is also rotated by the third gear 166 at speed slightly less than that of the second gear 190, but the kick spring 192 is not wound in by the rotation of the gear 190, and the first gear 170 rotates independently from the gear 190.

For reduced size copying at a reduction rate of 0.6467 times, the solenoid 178 is turned OFF and the solenoid 187 is turned ON, and the gear 172 rotates freely. Accordingly, the rotational driving force transmitted to the input timing pulley 165 causes the gear 181 to rotate by winding in the kick spring 183 through the rotary member 168, and from the gear 181, rotational force is further transmitted to cause the output timing pulley 193 to rotate in the clockwise direction through the second gear 190 and output shaft 163.

It should be noted here that the speed change device of the present invention is not limited to the embodiment as described in the foregoing, but may be modified in various ways within the scope of this invention. For example, particularly, the number of input shafts 161 and 162, gears 172 and 181, kick springs 174 and 183, and input timing pulleys 164 and 165 is to be n − 1 where the number of speed changes is 1, and the output shafts 163, first, second and third gears 170, 190 and 166, and output timing pulley 193 sufficiently serves the purpose. It should also be noted that the apparatus to which it is applicable is not limited to a copying apparatus.

As is clear from the foregoing description, the speed change device of the present invention includes one output shaft, the first gear mounted on the output shaft through one-way clutch means, the second gear secured to the output shaft, at least two gears respectively mounted on at least two input shafts through clutch means and in mesh with the second gear, the third gear secured to one of the input shafts and in mesh with the first gear. In the above arrangement, since the gear ratio of the third gear to the first gear is larger than the maximum of the gear ratios of the gear for the input shaft to the second gear, the number of gears to be engaged with the input shaft, clutch means and second gear may be n − 1 in the case where the speed change number is n, and thus, the output of predetermined speed change ratio is readily available by the change-over of the clutch means.

Although the present invention has been fully described by way of example with reference to the attached drawings, it is to be noted that various changes and modifications will be apparent to those skilled in the art. Therefore, unless otherwise such changes and modifications depart from the scope of the present invention, they should be construed as being included therein.

What is claimed is:

1. An electrophotographic copying apparatus which comprises an original platform of transparent plate material, an optical system having a light source for illuminating an original to be copied from beneath said original platform and reflecting mirrors and a lens assembly for directing a light image of the original illuminated by said light source onto a photoreceptor, and scanning means for scanning the original including a driving mechanism for relatively moving said optical system and said original platform, said scanning means further including a braking device having:
   (a) a brake shaft rotatably disposed in said driving mechanism for the scanning system,
   (b) spring means which is mounted on said brake shaft for applying a maximum braking force at a scanning starting position, and
   means for causing said spring means to gradually attenuate the braking force during the scanning.

2. An electrophotographic copying apparatus as claimed in claim 1, wherein said braking device further includes a brake member secured at said brake shaft, a brake plate member contactable under pressure with said brake member, and said spring means is a coil spring member engaged in a compressed stated with said brake plate member for imparting thereto the braking force, and said means for causing said spring means to gradually attenuate the braking force comprises means engaged with said coil spring member for gradually reducing the compression of said spring member during the scanning of said scanning means.

3. An electrophotographic copying apparatus as claimed in claim 2, wherein said brake shaft is a threaded shaft and is connected to the remainder of said driving mechanism for being rotated in opposite directions during scanning and during return of said optical system and original platform, said braking device further including a nut member threaded onto said brake shaft, means engaged with said nut member for preventing rotation thereof so that it is movable in the axial direction of said brake shaft when said shaft rotates, said coil spring member being in the compressed state between said nut member and said brake plate member for imparting the braking force to said brake plate member, the direction of the threads on said shaft being for causing, upon starting of scanning of said scanning means and transmission of rotational force to said brake shaft, said nut member to move on said brake shaft in a direction away from said brake plate member for attenuating the compression of said coil spring member, and, upon returning of said scanning means and reverse rotation of said brake shaft, causing said nut member to move in a direction toward the brake plate member to increase the compression of said coil spring member.

* * * * *